Dec. 13, 1960  J. E. MAINPRIZE  2,964,342
PACKING
Filed Sept. 15, 1958
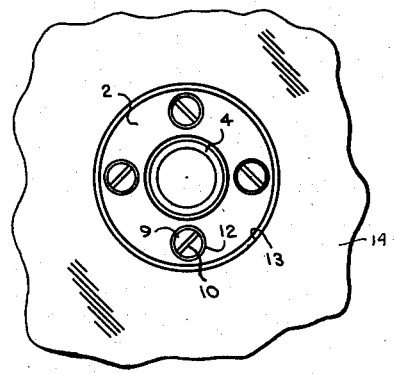
Fig. 2
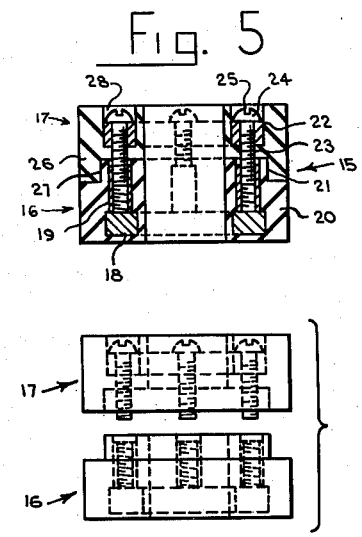
Fig. 5
Fig. 4
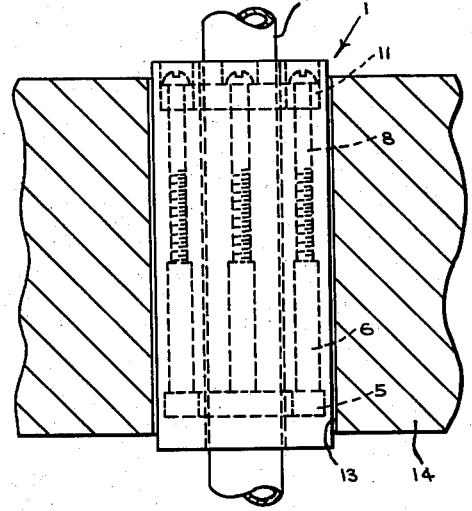
Fig. 1
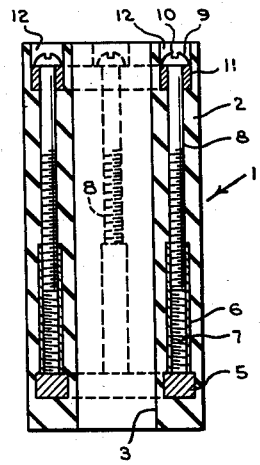
Fig. 3
INVENTOR.
JACK E. MAINPRIZE
BY

United States Patent Office 2,964,342
Patented Dec. 13, 1960

2,964,342

PACKING

Jack E. Mainprize, 5419 King Road, Rte. 1, Bridgeport, Mich.

Filed Sept. 15, 1958, Ser. No. 761,097

7 Claims. (Cl. 288—2)

This invention relates to packing devices and more particularly to a sealing gasket formed of yieldable, rubberlike material and which is adapted to provide a fluid-tight seal between a pipe, tube, or other conduit and the opening in a wall or the like through which the conduit passes.

Gaskets or seals of the general class to which the invention pertains have been proposed heretofore, but not all of them have been readily accepted by the trade inasmuch as most of the resilient packing devices in use heretofore have required the provision of especially tapered openings being formed in the wall through which a conduit is to pass or especially constructed tapering sealing devices adapted to be wedged between a conduit and the walls of the opening which accommodates it. Such special devices are costly to make and usually comprise a plurality of separate parts which must be assembled on the job. Moreover, many of the packings in use heretofore do not prevent metal-to-metal contact between a conduit and the part through which it extends and, consequently, do not result in a vibration-free connection. In those instances where a pipe enters an underground receptacle and where conventional packings do not prevent metal-to-metal contact between the pipe and the receptacle, the receptacle and the pipe are subjected to an electrolysis action, thereby necessitating frequent replacement of the pipe or the receptacle, or both.

In many of the packing devices used heretofore, the packing is compressed by means of nuts and bolts acting on pressure plates in which the pressure plates as well as portions of the nuts and bolts are exposed. In the case of an underground or out of doors installation, the exposed parts of the packing assembly are subpected to the ravages of weather and soon become corroded, thereby making it exceedingly difficult to disassemble the apparatus in the event disassembly becomes necessary.

An object of this invention is to provide a packing seal or gasket of simplified construction and which is capable of rapid assembly to produce a fluid-tight seal between a conduit and the wall of an opening through a support through which a pipe or conduit extends.

Another object of the invention is to provide a gasket of the kind referred to in which metal-to-metal contact between the conduit and the part through which it extends is precluded.

A further object of the invention is to provide a packing gasket construction in which the parts of the apparatus are substantially impervious to or are protected from corrosion.

A still further object of the invention is to provide a gasket seal which is capable of rapid and easy assembly and disassembly to and from the parts with which it is adapted to be used.

Other objects and advantages of the invention will be pointed out specifically or will become apparent from the following description when it is considered in conjunction with the appended claims and the accompanying drawings, in which:

Figure 1 is a plan view, partly in section, illustrating a gasket formed in accordance with one embodiment of the invention and assembled with a pipe or conduit passing through an opening in a wall;

Figure 2 is an end elevational view of the apparatus shown in Figure 1;

Figure 3 is a longitudinal sectional view of the gasket disclosed in Figures 1 and 2;

Figure 4 is an elevational, exploded view of a gasket formed in accordance with another embodiment of the invention; and Figure 5 is a sectional view of the gasket shown in Figure 4, but showing the parts in assembled condition.

A sealing gasket constructed in accordance with the embodiment of the invention shown in Figures 1–3 is disclosed as comprising a substantially tubular body member 1 having an annular wall 2 formed of neoprene or other suitable rubber-like material capable of being molded. The body member 1 is provided with a longitudinally extending bore 3 having a diameter slightly greater than the diameter of a conduit with which it is adapted for use, such as a pipe or tube 4, so as to enable the conduit to be received in the bore 3.

Adjacent to one end of the body member 1 a metal anchor ring 5 is embedded in the wall 2. At suitably spaced intervals around the ring 5 is a plurality of socket members 6 which may be welded at corresponding ends to the same face of the ring 5. Each of the sockets 6 is threaded interiorly as at 7 and receives the correspondingly threaded end of a force transmitting bolt or screw 8. The opposite end of each of the screws 8 is provided with a head 9 in which may be formed a screw driver slot 10.

At the opposite end of the wall 2 is embedded a ring 11 which is similar to the ring 5 and which is provided with a number of openings corresponding to the number of bolts 8 and through which the shanks of the bolts may pass so as to permit the heads 9 of the bolts to bear against the ring 11. The end of the wall 2 adjacent to the bolt heads 9 is provided with a plurality of recesses 12 by means of which a screw driver (not shown) may be placed in the slot 10 of each of the bolts 8 to turn the latter.

A gasket or seal such as is disclosed in Figures 1–3 may be formed by assembling the bolts 8 and the ring 11 with the anchoring parts 5 and 6 in the manner best shown in Figure 3. Thereafter, the assembly may be placed in a mold and the rubber-like material from which the wall 2 is formed may be introduced to the mold and around the parts of the apparatus to embed the latter in the wall 2. Inasmuch as recesses 12 should be formed in the one end of the wall, the mold may include supporting fingers corresponding to the shape of the recesses 12 and which support the metal parts of the assembly during the molding process.

To condition the apparatus for use, the body member 1 is slipped onto a conduit such as the pipe 4 and the conduit and body member 1 are inserted through an opening 13 form in a wall 14 of a housing or receptacle through which the conduit 4 must pass. In this connection, the diameter of the opening 13 should be large enough to accommodate the body member 1 easily. After the body member is in place, the force transmitting bolts 8 may be rotated by a screw driver so as to cause the rings 5 and 11 to be drawn towards one another. Relative movement of the rings 5 and 11 towards one another will cause the overall length of the member 1 to be reduced or compressed and will cause the annular wall 2 to "grow" or expand radially inwardly and outwardly so that the inner surface of the bore 3 squeezes or grips the wall of the conduit 4 and the outer surface of the wall 2 bears against the surface of the opening 13 in the member 14. In this condition of the device, the body wall 2 will form a fluid-tight seal between the conduit 4 and the wall of the opening in the member 14 and neither the member 14 nor any metal part of the gasket will be in contact with the wall of the pipe 4. Accordingly, the assembly of the gasket, the pipe 4 and the wall 14 will be vibration free. Since there is no contact between the pipe 4, the wall 14 or any metal parts of the gasket structure, the assembly may be placed underground, if desired, without fear of electrolysis.

When the parts have been assembled in the manner described, only the heads 9 of the bolts 8 are exposed. Thus, the only part of the apparatus which could become corroded would be the heads 9 of the bolts. The corrosion may be minimized or prevented by forming the bolts of aluminum or the like, or, if desired, a tarry substance could be used to fill the recesses 12. Alternatively, plugs (not shown) formed of the same material as the wall 2 and being of such size as to require forcible fitting into the recesses 12 may be utilized to protect the bolt heads 9 from moisture.

The embodiment of the invention disclosed in Figures 4 and 5 comprises a body member 15 composed of two parts 16 and 17. The base part 16 has an anchor ring 18 embedded therein and to which is welded or otherwise suitably secured a plurality of anchoring sockets 19 similar to the sockets 6 previously described. The anchoring ring 18 and the socket members 19 are embedded in an annular wall 20 formed of material similar to the material forming the wall 2, and the upper end of the wall 20 terminates in an upstanding boss or flange 21. The upper ends of the socket members 19 preferably terminate short of the upper end of the boss 21, but the wall 20 may have openings therein in communication with the members 19 and which may be formed during the molding process.

The upper member 17 includes a bearing ring 22 provided with a plurality of openings through which extend a corresponding number of force transmitting bolts 23 adapted to be received in the socket members 19. The bolts 23 include heads 24 which bear against the upper surface of the ring 22 and each head 24 may be provided with a screw driver-accommodating slot 25 by means of which the bolts may be turned.

The ring 22 and the major portion of the shanks of the bolts 23 are embedded in a wall 26 formed of the same material as the wall 20 and provided on its lower surface with a downwardly extending peripheral flange 27 which is adapted to nest or telescope with the flange 21 on the base portion 16 in the manner shown in Figure 5. The upper surface of the wall 26 is provided with recesses 28 similar to the recesses 12 and in which the heads 24 of the bolts 23 are received. As is best shown in Figure 4, the lower ends of the bolts 23 project below the lower surface of the body portion 26 so as to be capable of being inserted in the open ends of the socket members 19.

When using the construction shown in Figures 4 and 5, the body portions 16 and 17 are slipped onto a pipe such as the pipe 4 and are so related to one another that the flanges 21 and 27 telescope with each other. With the parts in these positions the bolts 23 may be turned so as to draw the rings 18 and 22 towards one another, whereupon the sidewalls of the body member 15 will be expanded both radially inwardly and outwardly to occupy completely the space between the wall of the pipe 4 and the wall of the opening through which the pipe extends. When the gasket is in its sealing position, the flanges 21 and 27 will be in very tight engagement with one another so as to preclude the entry of fluid therebetween. In operation, the apparatus shown in Figures 4 and 5 performs in the same manner as the embodiment previously described.

When it is desired to remove the pipe 4 from the wall through which it extends, it is a simple matter to remove the plugs or other material from the recesses 12 or 28 and turn the force transmitting bolts in such directions as to separate the pairs of rings. Separation of the rings will enable the walls of the respective devices to shrink radially and permit withdrawal of the pipe.

It will be understood that all references to "upper," "lower," and the like are made with reference to the disclosure in the drawing and not by way of limitation as to the positions of the parts in actual use.

The disclosure is intended to be illustrative of presently preferred forms of the invention rather than definitive thereof. The invention is defined in the claims.

I claim:

1. A sealing gasket comprising a body member having an annular wall formed of yieldable, rubber-like material; an anchoring device embedded in said wall adjacent to one end of said body member; a bearing device embedded in said wall adjacent to the other end of said body member, and force transmitting means interconnecting said anchoring device and said bearing device operable to draw said devices towards one another and compress the portion of said wall lying therebetween.

2. A gasket as set forth in claim 1 wherein said anchoring device includes a plurality of threaded socket members spaced around said wall and wherein said force transmitting means comprises a corresponding plurality of threaded screws received in said socket members.

3. A gasket as set forth in claim 2 wherein said bearing device comprises an annular member having a number of apertures therein to accommodate said screws and each of said screws has a head bearing on said annular member.

4. A gasket as set forth in claim 1 wherein said body member comprises a one-piece sleeve.

5. A gasket as set forth in claim 1 wherein said body member comprises a pair of tubular sleeves arranged end to end.

6. A gasket as set forth in claim 5 wherein the abutting ends of said sleeves have telescoping sections.

7. A sealing gasket comprising a walled, annular body member formed of rubber or the like material having a bore therethrough of such size as to accommodate a tubular conduit or the like, said body member and said conduit being receivable, when assembled, in the opening of a wall or the like; an anchor device located wholly within the wall of said body member adjacent to one end of the latter; a bearing device located wholly within the wall of said body member adjacent to the other end thereof; and force transmitting means located wholly within the wall of said body member and interconnecting said anchor device and said bearing device and being operable to draw said devices towards one another so as to compress said body member and cause the wall of the latter to swell in the region between said devices.

References Cited in the file of this patent
UNITED STATES PATENTS

| | | |
|---|---|---|
| 389,488 | Vacher | Sept. 11, 1888 |
| 569,247 | Smith | Oct. 13, 1896 |
| 2,417,107 | Gregoire | Mar. 11, 1947 |